United States Patent [19]

Li

[11] Patent Number: 5,186,415

[45] Date of Patent: Feb. 16, 1993

[54] AIRCRAFT HAVING MEANS FOR CONTROLLING THE GROUND EFFECT FLYING ALTITUDE BY SENSING AIR PRESSURE ON THE SURFACE OF THE WING

[76] Inventor: Qun Li, 18172 Beach Blvd., Huntington Beach, Calif. 92648

[21] Appl. No.: 524,301

[22] Filed: May 14, 1990

[51] Int. Cl.$^5$ ............................................. B64C 39/02
[52] U.S. Cl. .................................. 244/12.1; 180/116; 180/117; 244/203; 244/76 R
[58] Field of Search ............... 244/12.1, 100 R, 100 A, 244/75 R, 76 R, 203; 180/116, 117

[56] References Cited

U.S. PATENT DOCUMENTS 3,908,783  9/1975  Joerg et al. ........................ 180/116

FOREIGN PATENT DOCUMENTS 365700   5/1990  European Pat. Off. ............ 180/117
955922   4/1964  United Kingdom ................. 180/117
2120990 12/1983  United Kingdom ................. 180/116

Primary Examiner—Galen Barefoot

[57] ABSTRACT

This invention makes use of a pressure sensor, which is installed on the wing's surface of the aircraft, to sense the varied air pressure which comes from ground-effect on the wing's surface. A control apparatus is comprised of pressure sensor, a device of signal treatment and the device of elevator control. This apparatus solves the problems of excessively low ground-effected flying altitude and low efficiency of the whole aircraft.

2 Claims, 1 Drawing Sheet

AIRCRAFT HAVING MEANS FOR CONTROLLING THE GROUND EFFECT FLYING ALTITUDE BY SENSING AIR PRESSURE ON THE SURFACE OF THE WING

BACKGROUND OF THE INVENTION

This invention relates generally to an apparatus and a method for researching and producing a kind of low-flying aircraft, which apparatus and method make use of ground-effect of aircraft's wing. The principle of ground-effected aircraft is following: If an aircraft is flying within the range of ground-effect, when its flying altitude drops down, the lift force rises; and when it increases its flying altitude, the lift force reduces. So it has a stable equilibrium on altitude. When the relative altitude is raised, the changing rate of the lift force is droped, and the capacity of stable equilibrium is reduced. In order to keep its high stable equilibrium of altitude, the flying altitude must drop down. Up till now, the ground-effect aircraft can only keep its stable flight in an altitude of 10%–20% of its wing chord length; this causes poor anti-wave ability when the ground-effect aircraft flies over water. And it is impossible to keep the primary flying altitude when the craft makes a turn. For examples, ALBATROSS GROUND-EFFECT AIRCRAFT, which has been developed by China Boats and Ships Scientific Research Center recently, and gained the Unique First Prize in The 38th Unique International Invention Fair in Brussels, can only fly in an extremely low altitude. The FLARECRAFT-AIRFISH II, which has been developed by HYDRO-GLIDE INC., USA, has the same problem. The problem is: in order to raise the flying altitude, the aspect ratio should be reduced in design. But it would bring out a big difficulty for keeping the high efficiency of the whole aircraft. This is one of the main reasons why the ground-effect air-craft can't realize its practicality since it has been developed for one century.

SUMMARY OF THE INVENTION

Making use of variation of aerodynamic static pressure, this invention provides means to raise the ground-effect flying altitude. Its basic principle is: apply the air pressure (or pressure differential) sensors to sense the varied air pressure which comes from ground-effect on the surface of wing. The electronic signals which are output from sensors, and its extent is in proportion to the ground-effected flying altitude, control the angle of the elevator after it is treated and amplified. So the flying altitude can be adjusted. Since the weak pressure variation can be sensed by the sensors, and can be amplified to a high magnitude, the flying altitude can be controlled by making use of the weak ground-effect. So the ground-effect flying altitude can be raised a lot. An experiment has shown that use of this principle has resulted in that a ground-effect aircraft can fly stably above an altitude of 100% of its wing chord length.

DESCRIPTION OF THE PREFERRED EMBODIMENT

Figure 1:
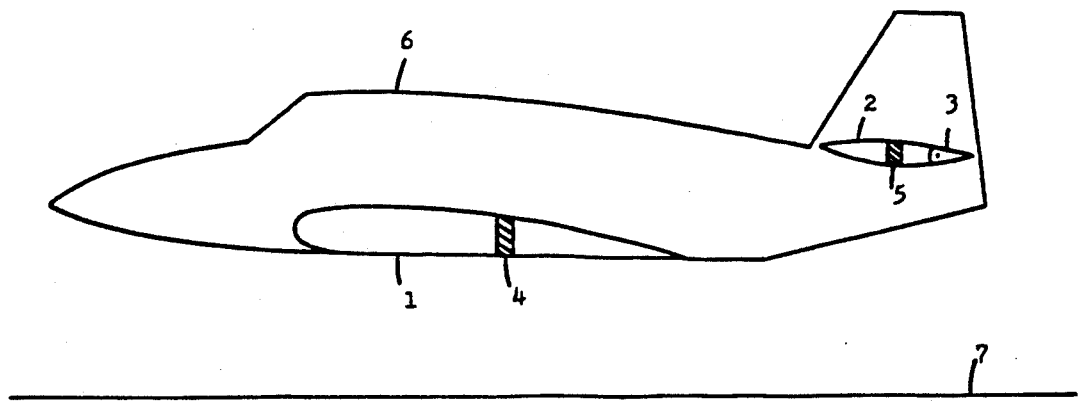
FIG. 1 is the main wing and horizontal tail of a ground-effect aircraft, and the pressure (or pressure differential) sensors which are installed on the surface of the wing.
Figure 2:
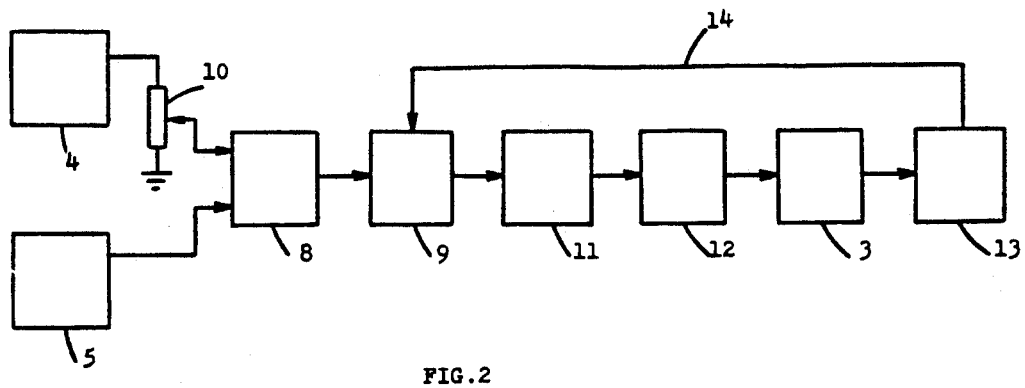
FIG. 2 is the block diagram of the first practical example of the above-mentioned altitude control device.

The first practical example of this invention—As show in FIG. 1 and FIG. 2, the device is composed of main wing's pressure sensors (or pressure differential sensors) 4; horizontal tail's pressure sensors (or pressure differential sensors) 5; comparative amplifier 8; comparative amplifier 9; altitude selectivity potentiometer 10; motor-drive circuit 11; elevator motor 12; elevator 3; angular displacement detector of the elevator 13. 14 is the angular displacment feedback signal of the elevator. 1 is the main wing of aircraft. 2 is horizontal tail. 6 is flying direction. 7 is ground surface.

Its working process follows: The values of dynamic static pressure (or relevant dynamic static pressure difference) on the main wing and the horizontal tail are detected by the main wing's pressure sensor (or pressure differential sensor) 4 and the horizontal tail's pressure sensor (or pressure differential sensor) 5 respectively. The both of the values are inputted into comparative amplifier 8. The differential value of them is inputted into the comparative amplifier 9. After it is compared with feedback signal 14, it is inputted into the motor-driven circuit 11 to drive the elevator motor 12 and control the deflection angle of the elevator 3. So the automatic control of the altitude of a ground-effect flying, craft can be realized. The angular displacement detector 13 which rotates coaxally with the elevator 3 feeds back the angular displacement signals 14 of the elevator's deflection angle to the comparative amplifier 9. The flying altitude can be adjusted steplessly by the altitude selectivity potentiometer 10.

Figure 3:
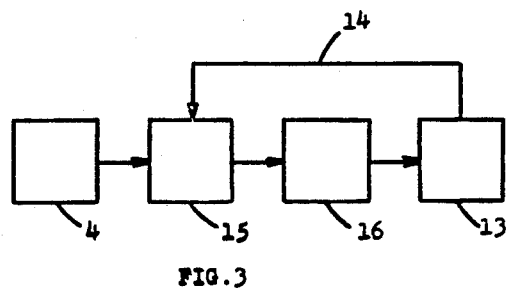
FIG. 3 is the block diagram of the second practical example of above-mentioned altitude control device.

The second practical example of this invention—As show in FIG. 1 and FIG. 3: the device is composed of main wing's pressure sensors (or pressure differential sensor) 4; autopilot 15; elevator 3 and angular displacement detector 13. 14 is the feedback signal of the angular displacement.

Its working process follows: The value of dynamic static pressure on the surface of the main wing is detected by the main wing pressure sensors (or pressure differential sensors) 4 and is inputted into autopilot 15. The electronic signals are treated by the autopilot to control the flying altitude of the aircraft.

By the way of above-mentioned method and device, the ground-effect flying altitude of aircraft can be increased above 5 times. Its anti-wave ability can also be increased a lot. And the aircraft can keep primary altitude when it makes a small radius turn. All of these expand the selective margin for design of a practical and high efficiency ground-effect aircraft, and make the ground-effect aircraft get into a practical stage. Moreover, the general airplane can also make a groundeffect flight by this way.

What is claimed is:

1. An aircraft for operation in ground effect having a main wing (1); and a horizontal tail (2), said horizontal tail having a smaller chord than said main wing, located on said aircraft at a higher position than said main wing and including a movable elevator (3) on its trailing edge; said aircraft further including means for controlling the height of said aircraft during ground effect flight comprising:

a) a first pressure sensor (4) which generates a first pressure signal representative of the aerodynamic pressure change directly on said main wing surface caused by height changes during ground effect flight;

b) a second pressure sensor (5) which generates a second pressure signal representative of the aerodynamic pressure changes on the surface of said horizontal tail;

c) signal treatment means receiving said first and second pressure signals and generating a control signal to cause the angle of said elevator to be changed to maintain a constant height for said aircraft during ground effect flight.

2. An aircraft according to claim 1 wherein said signal treatment means comprised a height selecting potentiometer (10) between said first pressure sensor (4) and a comparative amplifier (8), said comparative amplifier (8) uses said second pressure signal as a reference level to generate a first output signal to a second comparative amplifier (9) which generates said control signal.

* * * * *